United States Patent [19]

Adams et al.

[11] Patent Number: 5,198,506
[45] Date of Patent: Mar. 30, 1993

[54] HIGH ORGANIC PEROXIDE CONTENT POLYPROPYLENE

[75] Inventors: John D. Adams, Vermillion, Ohio; Richard H. Dorn, Spring, Tex.; Mark J. King, Elyria, Ohio; Jack L. Kulasa, Houston; Nicholas J. Motto, Spring, both of Texas; Leonard J. Ostanek, West Chester, Pa.; Daniel F. Petticord, Lorain, Ohio

[73] Assignee: Phillips Petroleum Company, Bartlesville, Okla.

[21] Appl. No.: 698,509

[22] Filed: May 10, 1991

[51] Int. Cl.$^5$ .............................................. C08F 8/00
[52] U.S. Cl. ............................... 525/333.8; 505/387
[58] Field of Search .............................. 525/333.8

[56] References Cited

U.S. PATENT DOCUMENTS

| | | | |
|---|---|---|---|
| 3,144,436 | 8/1964 | Greene et al. | 260/93.7 |
| 3,849,241 | 11/1974 | Butin et al. | 161/169 |
| 3,862,265 | 1/1975 | Steinkamp et al. | 260/878 R |
| 3,887,534 | 6/1975 | Baba et al. | 260/93.7 |
| 3,940,379 | 2/1976 | Castagna | 260/88.2 S |
| 3,978,185 | 8/1976 | Buntin et al. | 264/93 |
| 4,088,714 | 5/1978 | Huff et al. | 260/897 A |
| 4,221,882 | 9/1980 | Huff | 525/240 |
| 4,244,861 | 1/1981 | Spenadel | 260/42.33 |
| 4,376,851 | 3/1983 | Hogan et al. | 526/351 |
| 4,448,736 | 5/1984 | Emery et al. | 264/401 |
| 4,451,534 | 5/1984 | Akagi et al. | 428/372 |
| 4,451,589 | 5/1984 | Marman et al. | 523/124 |
| 4,578,430 | 3/1986 | Davison | 525/387 |
| 4,578,431 | 3/1986 | Shaw et al. | 525/387 |
| 4,707,524 | 11/1987 | Ehrig et al. | 525/387 |
| 4,804,577 | 2/1989 | Hazelton et al. | 425/224 |
| 4,874,447 | 10/1989 | Hazelton et al. | 156/167 |
| 4,897,452 | 1/1990 | Berrier et al. | 528/333.8 |
| 5,047,485 | 9/1991 | DeNicola, Jr. | 525/333.8 |

FOREIGN PATENT DOCUMENTS

| | | |
|---|---|---|
| 1442681 | 7/1973 | Austria. |
| 2540125 | 1/1984 | Spain. |
| 2100268A | 6/1982 | United Kingdom. |

Primary Examiner—Bernard Lipman
Attorney, Agent, or Firm—Carl D. Corvin

[57] ABSTRACT

A homogenous, free-flowing, resin containing 80 to 90 weight percent of polypropylene and 10 to 20 weight percent of liquid organic peroxide, where the weight percents are based on the total weight of the polypropylene and the liquid organic peroxide, is provided. Furthermore, a process is provided for producing this polypropylene by mixing 80 to 90 weight percent of polypropylene, in the form of 100–500 micron particles, with 10 to 20 weight percent of liquid organic peroxide, where the weight percents are based on the total weight of the polypropylene and the liquid organic peroxide.

11 Claims, No Drawings

HIGH ORGANIC PEROXIDE CONTENT POLYPROPYLENE

BACKGROUND OF THE INVENTION

This invention relates to polypropylene which has a high organic peroxide content.

It is known in the art that the molecular weight of polypropylene can be controlled by the addition of organic peroxides which will degrade the molecular weight of the polymer. Usually an organic peroxide is added to the polypropylene which is then heated to the organic peroxide's decomposition temperature where the organic peroxide proceeds to break the long polypropylene polymer chains apart.

It is also known in the art that masterbatching can be used to facilitate this process. The term "Masterbatching" as used in this disclosure is the process of adding a small amount of polypropylene, which has an organic peroxide and/or other additives within it, to a larger amount of polypropylene and subsequently blending and extruding in order to achieve the desired polypropylene characteristics. The term polypropylene as used in this disclosure and in the art refers to a homopolymer of propylene or a copolymer of propylene and another alpha-olefin. Furthermore, blending and extruding as referred to above are general references to procedures in the art used for processing polypropylene.

One problem in the art is the melt blending of large amounts of peroxide into polypropylene. This is difficult because the peroxide tends to decompose during the melt blending step. While some of the peroxide can survive the melt blending step, at least some of the peroxide degrades the polypropylene. Another problem with mixing solid polypropylene pellets, flakes, or powder, with a liquid organic peroxide, is that, the polypropylene does not usually form a homogeneous, free-flowing, phase with the liquid organic peroxide. Usually, an absorbant, such as silica, is added to the polypropylene in order to facilitate the addition of organic peroxide in the masterbatching process. However, absorbant which is added to the polypropylene can interfere with the processing of the polypropylene material. Therefore, polypropylene which could absorb liquid organic peroxide without the necessity of using other absorbants, such as silica, would be of great economic and scientific value.

SUMMARY OF THE INVENTION

It is an object of this invention to provide an improved polypropylene composition.

It is another object of this invention to provide an improved polypropylene process.

These an other objects of the invention will become apparent from the detailed description of the invention.

In accordance with this invention a homogenous, free-flowing, resin containing 80 to 90 weight percent of polypropylene and 10 to 20 weight percent of liquid organic peroxide, where the weight percents are based on the total weight of the polypropylene and the liquid organic peroxide, is provided. Furthermore, a process is provided for producing this polypropylene by mixing 80 to 90 weight percent of polypropylene, in the form of 100-500 micron particles, with 10 to 20 weight percent of liquid organic peroxide, where the weight percents are based on the total weight of the polypropylene and the liquid organic peroxide.

DETAILED DESCRIPTION OF THE INVENTION

The polypropylene used in the invention can be made by a high activity catalyst. This is because of the mimicking phenomenon. Stated in other words, the morphological characteristics of the catalyst are reproduced in the polymer because the morphological characteristics of the polymer are strictly dependent on the catalyst utilized. The term "morphological characteristics" as used in this specification is defined as the control of the polymer particles, in particular, the size, shape, size distribution, and compactness of the polymer particles. High activity catalysts are usually used in order to provide the best in morphological characteristics and polymerization activity.

The scientific and patent literature report several methods for the preparation of high activity catalysts. These catalysts tend to be magnesium chloride supported catalysts. They can be classified as follows:

1. catalysts obtained by milling mixtures of anhydrous magnesium chloride, electron donor, and a titanium compound;

2. catalysts obtained by milling anhydrous magnesium chloride with an electron donor and treated with a titanium compound, such as ($TiCl_4$), at a temperature above 80° C. followed by washing with hydrocarbon(s).

In practice, anhydrous magnesium chloride and an aromatic ester, usually ethylbenzoate in molar ratios between 2 and 15, are milled in a vibrating mill for 20 to 100 hours. The product is treated with an excess of titanium tetrachloride at a temperature between 80° and 130° C., and then washed with hydrocarbon(s) and dried. A typical final composition of the catalyst includes 0.5 to 3.5 weight percent titanium and 5 to 15 weight percent ethylbenzoate, the remainder being magnesium chloride. Smaller polymer sizes can be produced from smaller catalyst sizes because of the morphological control obtained with these type catalysts. Examples of these type catalysts and polymerization processes are disclosed in U.S. Pat. Nos. 4,425,257; 4,347,158; 4,422,957; 4,555,496; 4,618,661; 4,626,519; 4,774,300; and 4,680,351 which are hereby incorporated by reference.

The polymer particle size used in this invention can be obtained by using either a batch or continuous type process. If a batch type process is used, generally a high activity catalyst as described above is used with a short reactor residence time in order to produce small polymer particles. These particles can then be screened in order to achieve the proper polymer particle size used in this invention. If a continuous process is used, such as a slurry process, the resulting particle polymer product will have a varying size distribution. This size distribution can be screened in order to obtain the proper particle size used in this invention. The particle size to use in this invention is between 100 to 500 microns, preferably 125 to 450 microns and most preferably, 150 to 400 microns. At a particle size below about 100 microns the particles tend to be to fine to be useful in this invention whereas, at a particle size greater than 500 microns the composition tends to remain tacky and wet and not free-flowing. One suitable commercial source for these types of particles is AMOCO 10-6400 reactor grade polypropylene. However, any source used should be screen to provide the proper particle size. The amount of polypropylene to use is generally between 80 and 90 weight percent, preferably 83 to 89 weight percent and most preferably 85 to 88 weight percent when the weight percent are based on the total weight of polypropylene and liquid organic peroxide. It should be noted that the polypropylene can be taken directly from the reactor and used in this invention. "Taking directly" from the reactor means that the polypropylene has not been melted or similarly processes, nor has additives other than stabilizers and colorants been added, it does not necessarily means directly in time.

The organic peroxide used in this invention can be any liquid organic peroxide known in the art, for example:

2,5-dimethyl-2,5-di-tert-butylperoxy-3-hexyne; dicumylperoxide; and
2,5-dimethyl-2,5-di-tert-butylperoxy-hexane.

The amount of organic peroxide used in this invention is between 10 to 20 weight percent, preferably 11 to 17 weight percent and most preferably 12 to 15 weight percent, when the weight percent is based on the total weight of the polypropylene and liquid organic peroxide. At weight percents greater than 20 weight percent the polypropylene tends to remain wet and tacky after blending, thereby not forming a homogenous, free-flowing, composition. At weight percents below 10 weight percent there is the possibility the the liquid organic peroxide will not be homogenously distributed throughout the polypropylene.

In general, the polypropylene and the liquid organic peroxide can be mixed by any manner known in the art. This can be by mixing at low intensity, such as manually mixing the components in a container, or, the components can be mixed at high intensity by being placed, for example, in a Herschel mixer. For example, the polypropylene and the liquid organic peroxide could be placed in a Herschel mixer operating at about 100 to 1200 rpm's. If the polypropylene and liquid organic peroxide are mixed in a low intensity manner, usually some time is needed after the mixing in order to achieve the homogeneous, free-flowing, polypropylene material. The amount of time needed after mixing at low intensity to achieve the homogenous, free-flowing, composition is generally from 1 hour to 240 hours, preferably 2 hours to 150 hours, and most preferably 10 to 100 hours.

EXAMPLES

These examples are provided to further assist a person skill in the art with understanding this invention. These examples are intended to be merely illustrative and not meant to be unduly limiting the reasonable scope of this invention

EXAMPLE I

An inventive polypropylene resin was made by placing in a container 88 weight percent of a polypropylene fluff (fluff as used in this disclosure is defined as material which is generally fresh from the reactor, that it the material is not yet process by processes such as extruding) having an average particle size of 200–300 microns. In addition, 12 weight percent of 2,5-dimethyl-2,5-di-tert-butylperoxy-hexane was added. Mixing was done manually until a slightly moist and sticky composition was obtained. This composition was allowed to set for 2 days. Thereafter, it was observed that the composition was a homogeneous, free-flowing, powder composition.

EXAMPLE II

An inventive polypropylene resin was made by placing in a container 85 weight percent of a polypropylene fluff which had an average particle size of 200–300 microns. In addition, 15 weight percent of a liquid organic peroxide (2,5-dimethyl-2,5-di-tert-butylperoxy-hexane) was added. Mixing was done manually until a moist, sticky composition was observed. This composition was allowed to set for a period of 2+ days. It was then observed that the composition was a homogeneous, free-flowing, powder composition.

EXAMPLE III

An inventive polypropylene resin was made by placing in a Herschel mixer about 88 weight percent of a polypropylene fluff which had an average particle size of 200–300 microns. In addition, 12 weight percent of a liquid organic peroxide (2,5-dimethyl-2,5-di-tert-butylperoxy-hexane) was added. During this mixing time the Herschel mixer was operating at 400 rpm. After the entire amount of each component was added the stress placed upon the composition was increased. This was accomplished by increasing the revolution speed of the Herschel mixer from 400 rpm to 700 rpm for about 1–1½ minutes. The composition was then observed to be a homogeneous, free-flowing, powder composition.

That which is claimed is:

1. A homogeneous, free-flowing, composition of matter consisting essentially of:
   (a) 80 to 90 weight percent of polypropylene fluff having a particle size between 100 and 500 microns; and
   (b) 10 to 20 weight percent of a liquid organic peroxide; where the weight percents are based on the weight of (a) plus (b).

2. A composition according to claim 1 wherein said polypropylene fluff has a particle size between 200 and 300 microns.

3. A composition according to claim 1, wherein said liquid organic peroxide is 2,5-dimethyl-2,5-di-tert-butylperoxy-hexane.

4. A composition according to claim 1 wherein said polypropylene fluff has a particle size between 200 and 300 microns and said liquid organic peroxide is 2,5-dimethyl-2,5-di-tert-butylperoxy-hexane.

5. A homogeneous, free-flowing, composition of matter made by the process which consists essentially of:
   (a) producing polypropylene fluff having a particle size between 100 and 500 microns; and
   (b) mixing at high intensity, 80 to 90 weight percent of said polypropylene fluff, with 10 to 20 weight percent of liquid organic peroxide, where the weight percents are based on the total weight of said polypropylene fluff and said liquid organic peroxide, at a temperature below the decomposition temperature of said liquid organic peroxide, to form said homogeneous, free-flowing, composition of matter.

6. A composition according to claim 5 wherein said polypropylene fluff has a particle size between 200 and 300 microns.

7. A composition according to claim 5 wherein said liquid organic peroxide is 2,5-dimethyl-2,5-di-tert-butylperoxy-hexane.

8. A composition according to claim 5, wherein said polypropylene fluff has a particle size between 200 and 300 microns, and said liquid organic peroxide is 2,5-dimethyl-2,5-di-tert-butylperoxy-hexane.

9. A homogeneous, free-flowing composition of matter made by the process which consists essentially of:
(a) producing polypropylene fluff having a particle size between 100 and 500 microns; and
(b) mixing at low intensity, 80 to 90 weight percent of said polypropylene fluff, with 10 to 20 weight percent of liquid organic peroxide, where the weight percents are based on the total weight of said polypropylene fluff and said liquid organic peroxide, at a temperature below the decomposition temperature of said liquid organic peroxide, and allowing the composition to set for 1 to 240 hours, to form said homogenous, free-flowing, composition of matter.

10. A composition according to claim 9 wherein said composition is allowed to set for 10 to 100 hours.

11. A homogeneous, free-flowing, composition of matter made by the process which consists essentially of:
(a) taking directly from the reactor a polypropylene fluff having a particle size between 100 and 500 microns; and
(b) mixing at high intensity, 83 to 89 weight percent of said polypropylene fluff, with 11 to 17 weight percent of liquid organic peroxide, where the weight percents are based on the total weight of said polypropylene fluff and said liquid organic peroxide, at a temperature below the decomposition temperature of said liquid organic peroxide, to form said homogenous, free-flowing, composition of matter.

* * * * *